United States Patent Office 2,910,092
Patented Oct. 27, 1959

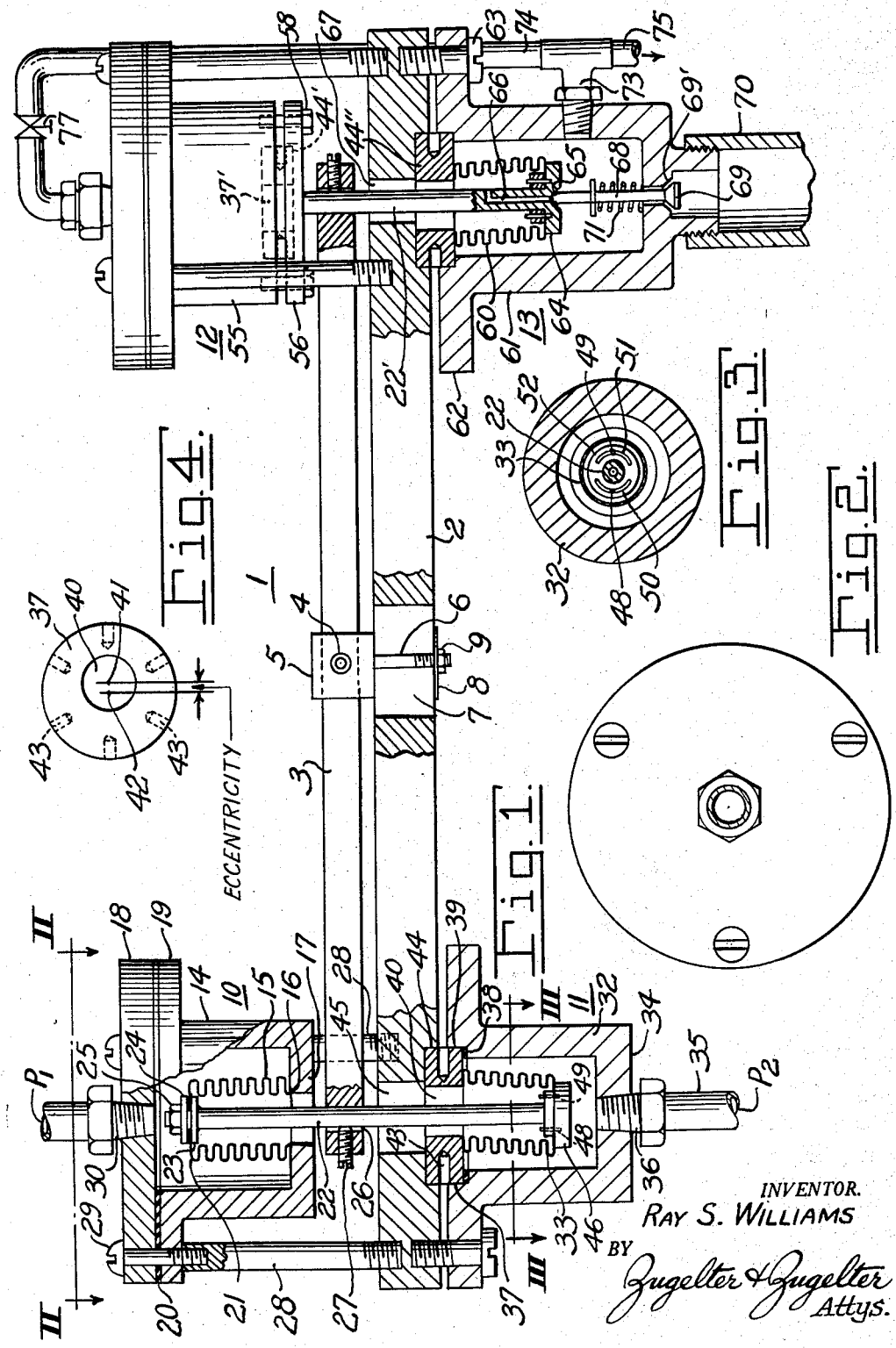

2,910,092

PRESSURE DIFFERENTIAL DEVICE EMBODYING PRESSURE DEFLECTABLE BELLOWS AND MEANS FOR ADJUSTING THE LINE OF ACTION OF THE BELLOWS

Ray S. Williams, Orrville, Ohio, assignor to Hagan Chemicals & Controls, Inc., a corporation of Pennsylvania Application August 18, 1955, Serial No. 529,216

4 Claims. (Cl. 137—785)

This invention relates to pressure responsive devices of the type including a beam having a fulcrum between the ends thereof and pairs of pressure actuated devices provided with flexible bellows arranged to exert opposed forces on the beam at fixed but adjustable distances from the fulcrum.

In devices of the above type, it is difficult to manufacture bellows that are exactly alike in all dimensions. Therefore, when they are embodied in pressure responsive devices, it is difficult to so pair them that each one of a pair will develop equal and opposite turning moments at equal pressures. When at equal pressures the opposed forces of the bellows do not produce equal and opposite turning moments about the fulcrum, inaccurate results follow.

An object of this invention is to provide devices of the above type with bellows assemblies having means whereby for equal pressures acting on opposed bellows one bellows can be easily adjusted so that the force produced by it can be made equal and opposite to the force produced by the opposing bellows with relation to the fulcrum.

Another object is to provide a bellows assembly for a device as set forth in the next preceding object in which the open end of a bellows is secured eccentrically to a circular rotatable member so that by rotating the member the center of the closed end of the bellows can be shifted transversely of its line of motion thereby adjusting the effective force that the pressure in the bellows will exert on the beam.

The foregoing and other objects of the invention will be apparent to those of ordinary skill in the art to which the invention pertains from the following description taken in conjunction with the accompanying drawings.

In the drawings:

Figure 1 is a view in side elevation, partly in section, of a device arranged and constructed in accordance with an embodiment of the invention;

Fig. 2 is a top-plan view of the device as seen when looking in the direction of arrows II—II of Fig. 1;

Fig. 3 is a view in section taken on line III—III of Fig. 1; and

Fig. 4 is a plan-view of a detail embodied in a bellows assembly of Fig. 1.

For purposes of illustration, the bellows assembly of the invention is shown in Fig. 1 as embodied in a ratio totalizer 1. The totalizer comprises a base or support 2 having supported thereon a beam 3 provided with a fulcrum 4 mounted in a carriage 5 that is slidable longitudinally of the base 2. The carriage 5 is provided with a threaded stem 6 that extends through a slot 7 formed longitudinally of the beam 2. The stem 6 is provided with a washer 8 and a nut 9 whereby the fulcrum carriage 5 may be clamped in any adjusted position along the beam 3.

The device 1 may include a plurality of pressure receiving devices 10, 11 and 12 and a device 13 which develops a pressure that is a function of the relative values of pressure in devices 10, 11 and 12.

Device 10 comprises a housing 14 having therein a bellows 15, the open end of which is joined as at 16 to the lower end 17 of the housing 14. The housing 14 is provided with a cap 18 that is bolted or otherwise suitably secured to a flange 19 of the housing. A gasket 20 between the cap 18 and the flange 19 serves to seal the joint between the cap 18 and the flange 19.

The upper end 21 of bellows 15 is closed and connected to the upper end of a rod 22. The rod is provided with a flange 23 on the inner face of the closed end of the bellows and with a washer 24 which, when a nut 25 is tightened, forms a tight seal at the point where the rod passes through the bellows. The rod or stem 22 passes through an aperture 26 in the left-hand end of beam 3 and is secured to the beam by means of a set screw 27. The unit 10 is supported on the base or frame 2 by means of a plurality of studs 28, the lower ends of which are threaded into the base. The flange 19 and the cap 18 are secured to the upper ends of the studs 28 by means of screws 29 that pass through the cap 18 and the flange 19 as shown.

The cap 18 is provided with a port to which a fitting 30 is connected by means of which pressure P1 may be supplied to the interior of the housing 14.

The pressure receiving unit 11 is disposed to act on beam 3 in opposition to the action of bellows 15 on the beam and means are provided in unit 11 for causing the same to act at the same distance from the fulcrum 4 as the bellows 15 does.

Device 11 comprises a housing 32 having a bellows 33 therein. As shown, the lower end 34 of the housing is closed and provided with an aperture to which a pipe 35 and a fitting 36 may be connected to admit a pressure P2 to the housing. The inner end or the lower end of the bellows 33 is closed and connected to the lower end of the stem or rod 22. The upper or open end of the bellows 33 is secured to a rotatable circular plate 37 which is seated on a gasket 38 in a recess 39 in the upper end of the housing 32. The plate 37 is provided with a circular aperture 40, the center 41 of which is eccentric to the center 42 of the plate.

The rim or edge of the plate 37 is provided with a plurality of uniformly spaced sockets 43 to accommodate a spanner wrench or the like by means of which the disc may be rotated. The upper face of the disc or plate 37 is seated in a recess 44 in the bottom of the base or frame 2. The frame 2 is provided with an aperture 45 through which the rod or stem 22 passes.

The pressure side of the closed end of bellows 33 is provided with a reinforcing plate 46, which is brazed or welded to the end of the bellows in any suitable manner. Plate 46 is provided with pins 48 and 49 disposed 180° apart that project into the hollow of the bellows 33. The pins 48 and 49 are received in arcuate slots 50 and 51 in a flange 52 abutting the inner face of the closed end of the bellows. Thus as the plate 44 is rotated, the lower end of the stem or rod 22 may turn but, as it turns, the pins 48 and 49 travel relatively speaking in the slots 50 and 51. Thus, the force produced by pressure in the bellows 33 on the beam 3 may be made equal and opposite to the force produced by an equal pressure in bellows 15. Consequently, for equal values of pressures in bellows 15 and 33, the forces exerted by them on beam 3 will be equal and opposite; therefore, the turning moments of those forces about the fulcrum 4 will be equal and opposite.

As stated supra, it is difficult to make bellows such as the bellows 15 and 33, in substantial numbers, having precisely the same effective areas. Therefore, in order that the moment developed by bellows 33 at a given pressure, about fulcrum 4, shall be equal to that developed by bellows 15 at a pressure of equal value, about fulcrum 4, provision must be made for so adjusting the product of the effective area of one or the other of these bellows, for example, bellows 33, and the pressure acting thereon, that said product is equal to the product of the area of bellows 15 and a pressure of equal value. The means for adjusting the pressure-area product of bellows 33 has been incorporated in the bellows unit 11 as described. By examination of Figures 3 and 4, it will be seen that by rotating the plate 37, the effective area of bellows 33 is so modified that the moments about fulcrum 4 of the forces developed by bellows 15 and 33 can be made equal and opposite when the pressures applied to those bellows are of equal value.

The bellows assembly embodied in the device 11 may also be incorporated in devices 12 and 13. It is optional with device 13 and may be used or not as necessity dictates.

Device 12 is similar in all respects to device 11 with the exception of the manner in which the rotatable disc or plate 37' is clamped to the bottom of the housing 55 thereof. The housing 55 includes a bellows like the bellows 33 and the lower or open end thereof is secured to the rotatable plate 37'. The lower face of the plate is received in a recess 44' in a clamping plate 56. The clamping plate 56 is secured to the housing 55 by means of screws 58. By rotating the member 37', the bellows in the housing 55 may be caused to act precisely at the same distance from the fulcrum 4 as the bellows of device 13 does.

Device 13 includes a bellows 60, the lower end of which is secured to a rotatable plate 44". Plate 44" is seated in recesses in the base member 2 and in the open end of housing 61 as shown. The flange 62 of the housing 61 is bolted to the underside of the base 2 by means of bolts 63. By loosening the bolts 63 and turning the plate 44", the center of the closed end of the bellows 60 may be adjusted to cause it to line up with the line of action of the bellows in device 12.

The bellows 60 may be provided at its closed end with a valve plate 64 having an exhaust port seat 65 that communicates with a passage 66 leading to the hollow of the bellows 60 and to the atmosphere through the aperture in the plate 44' and an aperture 67 in the base 2. The exhaust port 65 is controlled by a valve stem 68 having a valve 69 that controls an inlet port 69' to which pressure medium such as compressed air is supplied by a pipe 70 at substantially constant pressure. A spring 71 is provided for urging the valve stem 68 in a direction to seat the valve 69 on the inlet port seat 69'.

When the device 1 is in equilibrium, the exhaust port 65 and the inlet port 69' are both closed. If the beam 1 tilts clockwise, the inlet port is opened by the valve 69 moving off the port until the pressure in the housing 61 builds up to a value where the force exerted by the bellows 60 will return the beam to balanced position.

As illustrated, the pressure developed in the housing 61 passes through a port in a wall thereof into a pipe 73, one branch 74 of which leads to the interior of the housing 55 and the other branch 75 of which leads to some point where apparatus is to be regulated or controlled or a pressure is to be measured.

The branch 74 may be provided with a needle valve 77 whereby the rate at which the pressure changes in housing 55 may be controlled. When the pressure in housing 55 equals that in housing 61, the forces exerted by devices 12 and 13 on the beam 3 are equal and opposite. Therefore, pressure changes in housing 61 will result from a change in either pressure P1 or pressure P2. The beam will be in equilibrium when pressure P1 equals pressure P2, assuming that the effective areas of the bellows 15 and 33 are equal.

From the foregoing description it will be apparent that the bellows assembly as incorporated in device 11 and in devices 12 and 13 may be applied to differential pressure instruments, relays and the like without departing from either the spirit or the scope of the illustrated embodiment of the invention. Therefore, what is claimed as new and desired to be secured by Letters Patent is:

1. A bellows assembly comprising a housing which is open at one end and closed at the other, a bellows in the housing, one end of the bellows being closed and the other open, the closed end of the bellows being adjacent the closed end of the housing, a rotatable circular plate at the open end of the housing and having therein a circular aperture which is eccentric to the center of rotation thereof, the open end of the bellows being secured to the plate concentrically with said aperture, the housing having a circular recess for receiving and retaining the plate whereby on rotation of the plate the force produced by the bellows in response to a given pressure may be adjusted.

2. A housing and bellows assembly for devices adapted to exert a force on a fulcrumed member at a fixed distance from the fulcrum, comprising a housing having a bellows therein, one end of the bellows being closed and the other open, a circular rotatable plate having an aperture therein, the housing having a circular recess in which the plate is releasably secured to the housing, the open end of said bellows being secured eccentrically of the center of rotation of the plate, and a stem extending into the bellows through the open end thereof and having the other end within the bellows secured to the closed end of the same, the opposite end of the stem being disposed to engage the fulcrumed member, said rotation of said plate about its center causing rotation of the bellows whereby the force produced by the bellows at any pressure may be adjusted.

3. A pressure actuated device comprising a beam mounted on a fulcrum, a pair of housings on the same side of the fulcrum but on opposite sides of the beam, each housing having a bellows therein adapted to be flexed in a direction normal to the beam in response to pressure admitted to the housing, each bellows having its open end facing the beam and its closed end coupled to the beam in opposed relation at substantially the same distance from the fulcrum, the open end of the housing being sealed to the open end of the bellows, a rotatable plate associated with the other housing, the open end of the bellows therein being sealed eccentrically to the center of said plate, said plate being rotatable about its center to thereby adjust the force produced by said bellows at any operating pressure.

4. In a pressure responsive totalizer having a beam and a fulcrum therefor and a pair of pressure receiving devices, each device being provided with a housing having a deflectible bellows therein and means for coupling the bellows to the beam so that the bellows exert opposed forces on the beam at substantially right angles thereto and at fixed distances from the fulcrum, one of said housings having a circular recess in the open end thereof, a circular plate disposed in and retained by said recess; the bellows in said housing having its open end secured to said circular plate eccentrically of the center thereof, a stem connecting the closed end of said bellows to said beam means for releasably securing said plate, the plate being rotatable about its center whereby the force exerted by said bellows on said beam at a given pressure can be adjusted to a value equal and opposite to that produced by the opposing bellows at a pressure of the same value.

References Cited in the file of this patent
UNITED STATES PATENTS

| | | |
|---|---|---|
| 1,912,937 | George | June 6, 1933 |
| 2,111,230 | Toussaint | Mar. 15, 1938 |
| 2,230,056 | Hill | Jan. 28, 1941 |
| 2,455,184 | Markson | Nov. 30, 1948 |
| 2,631,599 | Markson | Mar. 17, 1953 |
| 2,642,747 | Levan | June 23, 1953 |